US008941897B2

(12) United States Patent
Ukai

(10) Patent No.: US 8,941,897 B2
(45) Date of Patent: Jan. 27, 2015

(54) IMAGE READING APPARATUS AND MEDIUM CONVEYANCE APPARATUS

(71) Applicant: Brother Kogyo Kabushiki Kaisha, Nagoya-shi, Aichi-ken (JP)

(72) Inventor: Shinji Ukai, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/039,944

(22) Filed: Sep. 27, 2013

(65) Prior Publication Data

US 2014/0092456 A1 Apr. 3, 2014

(30) Foreign Application Priority Data

Sep. 28, 2012 (JP) ................................ 2012-216432

(51) Int. Cl.
*H04N 1/04* (2006.01)
*H04N 1/00* (2006.01)

(52) U.S. Cl.
CPC ....... *H04N 1/00588* (2013.01); *H04N 1/00602* (2013.01); *H04N 1/00557* (2013.01)
USPC ............ 358/498; 358/497; 358/496; 358/474

(58) Field of Classification Search
USPC ................................. 358/498, 497, 496, 474
See application file for complete search history.

(56) References Cited

U.S. PATENT DOCUMENTS

| | | | | |
|---|---|---|---|---|
| 2003/0142191 | A1 * | 7/2003 | Rasmussen et al. | .......... 347/104 |
| 2005/0057785 | A1 | 3/2005 | Endo | |
| 2008/0259414 | A1 | 10/2008 | Kitagawa et al. | |
| 2008/0285097 | A1 | 11/2008 | Kitagawa et al. | |
| 2012/0105925 | A1 | 5/2012 | Shirai et al. | |

FOREIGN PATENT DOCUMENTS

| | | | |
|---|---|---|---|
| JP | H09-284478 | A | 10/1997 |
| JP | 2005-051313 | A | 2/2005 |
| JP | 2008-270954 | A | 11/2008 |
| JP | 2008-285259 | A | 11/2008 |
| JP | 2011-66676 | A | 3/2011 |
| JP | 2012-015677 | A | 1/2012 |
| JP | 2012-034186 | A | 2/2012 |
| JP | 2012-065064 | A | 3/2012 |
| JP | 2012-100115 | A | 5/2012 |

* cited by examiner

*Primary Examiner* — Houshang Safaipour
(74) *Attorney, Agent, or Firm* — Scott, Scott, Murphy & Presser, PC

(57) ABSTRACT

An image reading apparatus includes a housing having a conveyance path where a first medium and a second medium are conveyed; a pair of first conveyance rollers that has a first driving roller and a first pinch roller; a pair of second conveyance rollers that has a second driving roller and a second pinch roller having an outer diameter smaller than that of the first pinch roller, and wherein the first driving roller and the first pinch roller are positioned at an outside of a conveyance area in the axis direction, wherein the second driving roller and the second pinch roller are positioned at an inside of the conveyance area in the axis direction, wherein the second pinch roller, and wherein the first pinch roller and the second pinch roller are rotatably supported about a driven shaft center parallel with a driving shaft center.

10 Claims, 10 Drawing Sheets

IMAGE READING APPARATUS AND MEDIUM CONVEYANCE APPARATUS

CROSS-REFERENCE TO RELATED APPLICATION

This application claims priority from Japanese Patent Application No. 2012-216432 filed on Sep. 28, 2012, the entire subject matter of which is incorporated herein by reference.

TECHNICAL FIELD

This disclosure relates to an image reading apparatus and a medium conveyance apparatus.

BACKGROUND

An image reading apparatus includes a housing, a pair of first conveyance rollers and a pair of second conveyance rollers, for example.

The housing includes a conveyance path. The conveyance path is configured to guide a first medium and a second medium. The second medium is narrower and thicker than the first medium. The second medium is guided in a conveyance area that is positioned at one end side of the conveyance path in a width direction of the first medium.

The pair of first conveyance rollers has a first driving roller that is rotated and a first pinch roller that is biased towards the first driving roller and is driven and rotated by the first driving roller. A part of one end sides of the first driving roller and the first pinch roller in the width direction is positioned in the conveyance area in the width direction. The pair of first conveyance rollers is configured to convey the first medium on the conveyance path and to convey the second medium on the conveyance path.

The pair of second conveyance rollers has a second driving roller that is rotated and a second pinch roller that is biased towards the second driving roller and is driven and rotated by the second driving roller. The second driving roller and the second pinch roller are positioned in the conveyance area in the width direction. The pair of second conveyance rollers is configured to convey the second medium on the conveyance path together with the pair of first conveyance rollers.

The first driving roller and the second driving roller are rotatably supported about a driving shaft center parallel with the width direction. The first pinch roller is rotatably supported about a first driven shaft center parallel with the driving shaft center. The second pinch roller is rotatably supported about a second driven shaft center, which is parallel with the driving shaft center and which is more spaced from the driving shaft center as compared with the first driven shaft center spaced from the driving shaft center.

In the above image reading apparatus, the pair of the first conveyance rollers and the pair of the second conveyance rollers convey the first and second media having different widths each other.

SUMMARY

According to the image reading apparatus, the part of one end sides of the first driving roller and the first pinch roller in the width direction is located in the conveyance area in the width direction. Thus, when conveying the second medium, the part of one end sides of the first pinch roller in the width direction and the second pinch roller contacts the second medium. At this time, the first pinch roller may partially contact the second medium thicker than the first medium. The partial contact means that the first pinch roller partially contacts the second medium and the other part of the first pinch roller contacts the first driving roller, for example. Therefore, the first driven shaft center of the first pinch roller may be inclined. Thereby, a conveyance resistance acting on the second medium from the first pinch roller and a conveyance resistance acting on the second medium from the second pinch roller may be unbalanced. As a result, in the above image reading apparatus, the second medium may skew in the conveyance area of the conveyance path.

In view of the above, this disclosure provides at least an image reading apparatus and a medium conveyance apparatus capable of conveying a first medium and a second medium having different widths and suppressing a skew of the second medium in a conveyance area of a conveyance path.

In view of the above, an image reading apparatus comprises a housing, a pair of first conveyance rollers, a pair of second conveyance rollers, and a reading unit. The housing has a conveyance path where a first medium and a second medium that is narrower and thicker than the first medium are conveyed. The pair of first conveyance rollers has a first driving roller and a first pinch roller, which is biased towards the first driving roller and is rotated by the first driving roller, and is configured to convey the first medium on the conveyance path. The pair of second conveyance rollers has a second driving roller and a second pinch roller, which is rotated by the second driving roller, and is configured to convey the second medium on a conveyance area that is positioned at one end-side of the conveyance path in an axis direction of the second driving roller an outer diameter of the second pinch roller is smaller than an outer diameter of the first pinch roller. The reading unit configured to read images of the first and second media. The first driving roller and the first pinch roller are positioned at an outside of the conveyance area in the axis direction. The second driving roller and the second pinch roller are positioned at an inside of the conveyance area in the axis direction. The first driving roller and the second driving roller are rotatably supported about a driving shaft center parallel with the axis direction. The first pinch roller and the second pinch roller are rotatably supported about a driven shaft center parallel with the driving shaft center.

In another aspect of this disclosure, an image reading apparatus comprises a housing, a pair of first conveyance rollers, pair of second conveyance rollers, and a reading unit. The housing has a conveyance path where a first medium and to guide a second medium that is narrower and thicker than the first medium are conveyed. The pair of first conveyance rollers has a first driving roller; and a first pinch roller, which is biased towards the first driving roller and is rotated by the first driving roller, and is configured to convey the first medium on the conveyance path. The pair of second conveyance rollers has a second driving roller and a second pinch roller, which is rotated by the second driving roller, and is configured to convey the second medium on a conveyance area that is positioned at one end-side of the conveyance path in an axis direction of the second driving roller an outer diameter of the second pinch roller is the same as an outer diameter of the first pinch roller. The reading unit configured to read images of the first and second media. The first driving roller and the first pinch roller are positioned at an outside of the conveyance area in the axis direction. The second driving roller and the second pinch roller are positioned at an inside of the conveyance area in the axis direction. The first driving roller and the second driving roller are rotatably supported about a driving shaft center parallel with the axis direction. The first pinch roller is rotatably supported about a first driven shaft center parallel with the driving shaft center. The second pinch roller is rotatably supported about a second driven shaft center that is parallel with the driving shaft center and is more spaced from the driving shaft center than the first driven shaft center. The first pinch roller has a first driven shaft that defines the first driven shaft center. The second pinch roller has a second driven shaft that is a separate member from the first driven shaft and defines the second driven shaft center. The image reading apparatus comprises a holder that holds the first driven shaft and the second driven shaft and a biasing part that urges the holder towards the driving shaft center.

In another aspect of this disclosure, an image reading apparatus comprises, a housing, a pair of first conveyance rollers, a pair of second conveyance rollers, an image reader. The housing has a conveyance path. The pair of first conveyance rollers comprises: a first driving roller rotatably supported about a first driving shaft center parallel with an axis direction; and a first pinch roller towards the first driving roller and rotatably supported about a driven shaft center parallel with the driving shaft center. The pair of second conveyance rollers comprises: a second driving roller supported about the first driving shaft center; and a second pinch roller rotatably supported about the driven shaft center parallel and having an outer diameter smaller than an outer diameter of the first pinch roller. The image reader extending along the axis direction. The pair of the first conveyance rollers is positioned outside of a conveyance area in the axis direction, and the conveyance area is positioned at one end-side of the conveyance path in the axis direction. The pair of the second conveyance rollers is positioned inside the conveyance area in the axis direction.

Therefore, according to the medium conveyance apparatus of this disclosure, it is possible to convey the first and second media having different widths and to suppress the skew of the second medium.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, first to sixth illustrative embodiments implementing this disclosure will be described with reference to the accompanying drawings.

First Illustrative Embodiment

Figure 1:
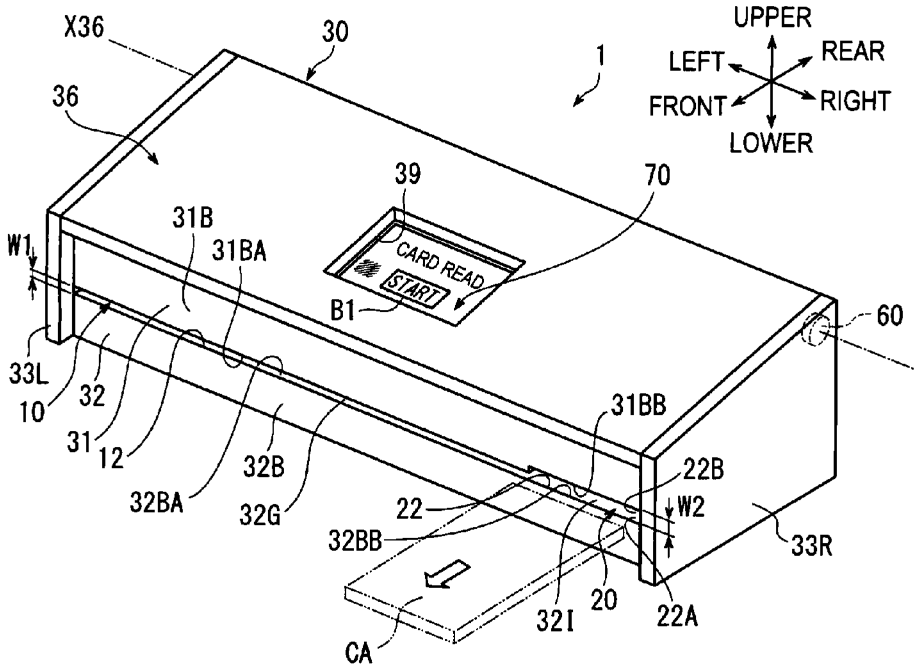
FIG. 1 is a front perspective view illustrating an image reading apparatus 1 according to a first illustrative embodiment implementing the image reading apparatus and the medium conveyance apparatus of this disclosure.

As shown in FIG. 1, an image reading apparatus 1 of a first illustrative embodiment is an example of a specific aspect of the image reading apparatus and the medium conveyance apparatus of this disclosure. In FIG. 1, respective directions of front, rear, left, right, upper and lower are indicated by defining a side of a first discharge opening 12 as an apparatus front and a side of a side frame 33L (left side frame), which is an opposite side of the side frame 33R (right side frame), as a left side. The respective directions shown in FIGS. 2 to 16 are indicated in correspondence to the respective directions shown in FIG. 1. In the below, respective elements of the image reading apparatus 1 are descried with reference to FIG. 1 and the like.

<Configurations>

As shown in FIGS. 1 to 7, the image reading apparatus 1 has a housing 30, a tray 36, a control substrate 54, a conveyance unit 40, a reading unit 55, a touch panel 70, and an open/close position sensor 60.

Figure 3:
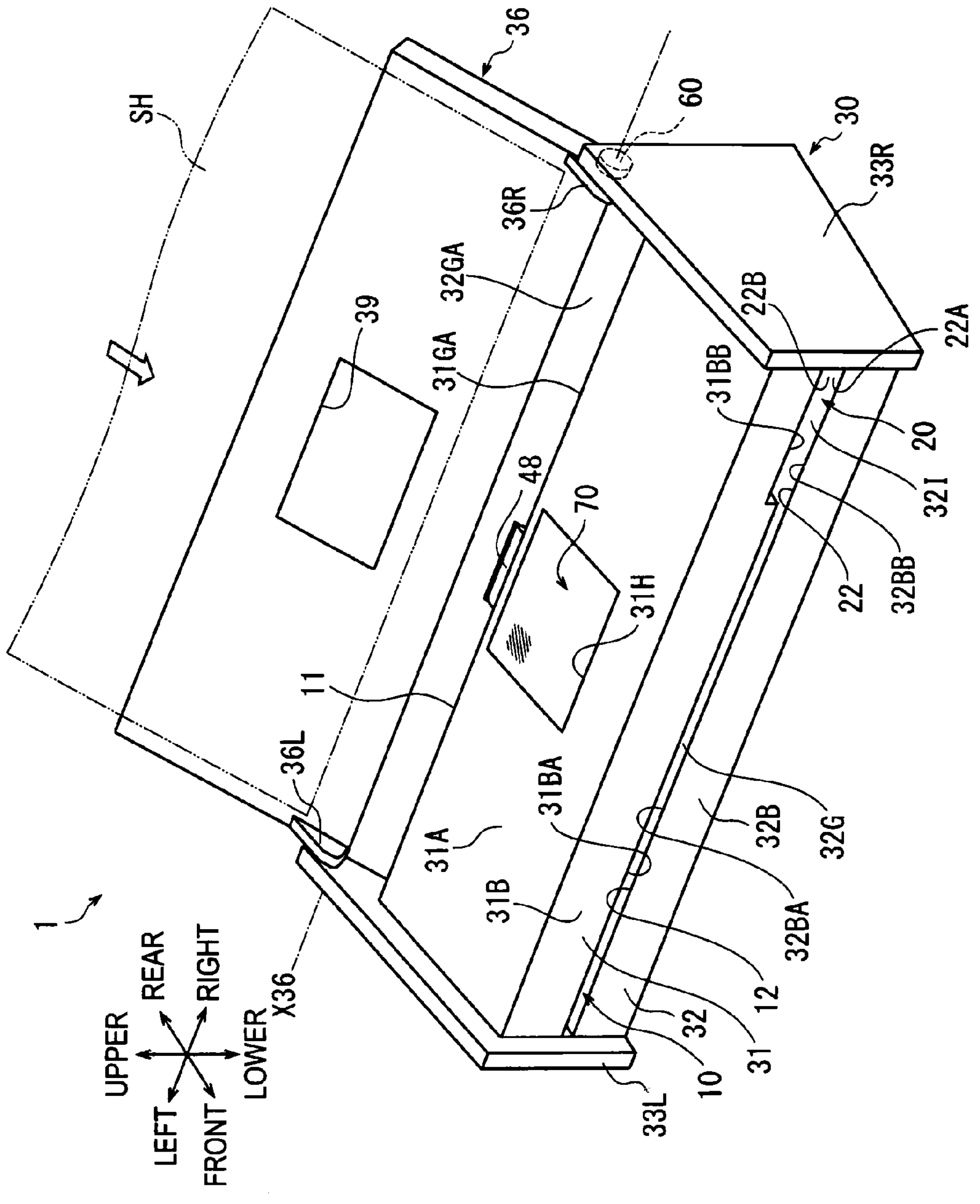
FIG. 3 is a front perspective view illustrating the image reading apparatus 1 at a state where a tray 36 is located at an open position.
Figure 6:
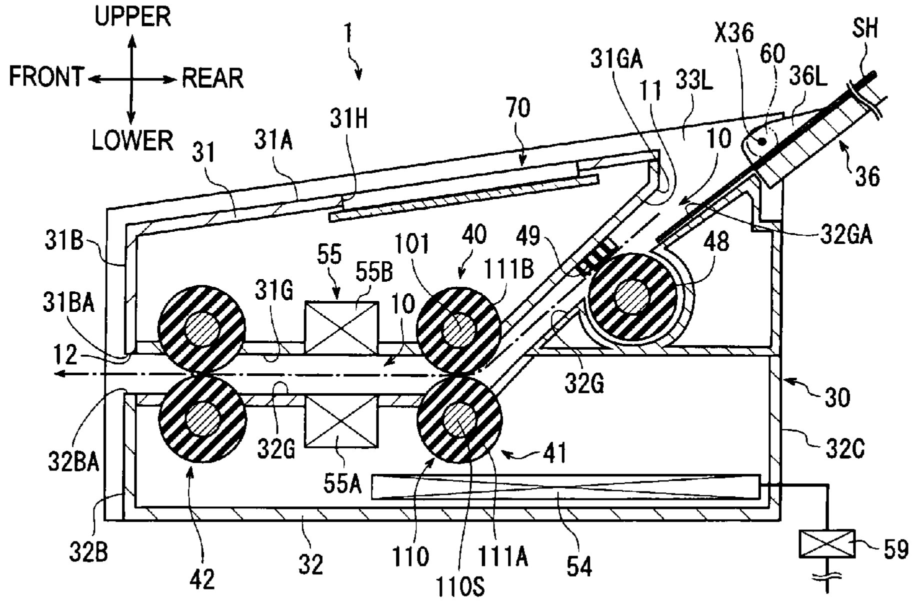
FIG. 6 is a schematic sectional view taken along a line A-A of FIG. 5.
Figure 7:
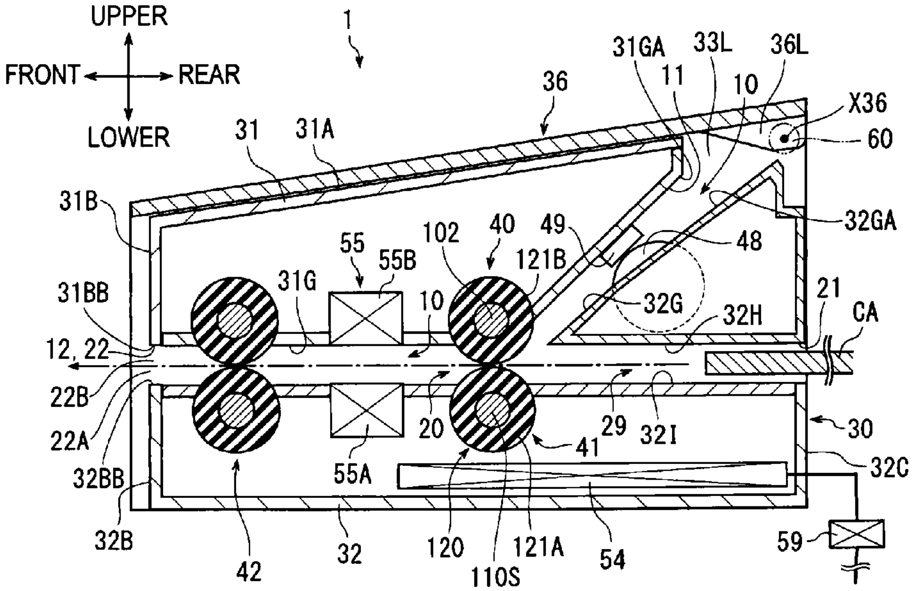
FIG. 7 is a schematic sectional view taken along a line B-B of FIG. 5, showing a state where the tray 36 is located at a close position.

As shown in FIGS. 3, 6 and 7, the housing 30 has a first housing 31, a second housing 32 and a pair of side frames 33L, 33R.

The first housing 31 positioned at an upper side and the second housing 32 positioned at a lower side are opposed to each other at an interval in the upper-lower direction. The left side frame 33L and the right side frame 33R sandwich the first housing 31 and the second housing 32 from outer sides in the left-right direction.

The first housing 31 has an upper surface 31A, a front surface 31B, an upper side guide surface 31G and the like. The upper surface 31A is a plane facing upwards. The upper surface 31A is upwards inclined towards the rear. The touch panel 70 is provided at center of the upper surface 31A. The front surface 31B is a plane facing in the front direction. The front surface 31B continues to a front end edge of the upper surface 31A and extends perpendicularly downwards. The upper side guide surface 31G continues to a lower end edge 31BA of the front surface 31B and extends to the rear direction. The upper side guide surface 31G is bent upwards at a center of the first housing 31 in the front-rear direction and is upwards inclined towards the rear.

The second housing 32 has a front surface 32B, a lower side guide surface 32G and a rear surface 32C. The front surface 32B is a plane facing in the front direction. An upper end edge 32BA of the front surface 32B is spaced downwards from the lower end edge 31BA of the front surface 31B at an interval. The front surface 32B extends perpendicularly downwards. The lower side guide surface 32G continues to the upper end edge 32BA of the front surface 32B and extends to the rear direction. The lower side guide surface 32G is bent upwards at a center of the second housing 32 in the front-rear direction and is upwards inclined towards the rear. The rear surface 32C is a plane facing in the rear direction. The rear surface 32C extends perpendicularly downwards.

Figure 5:
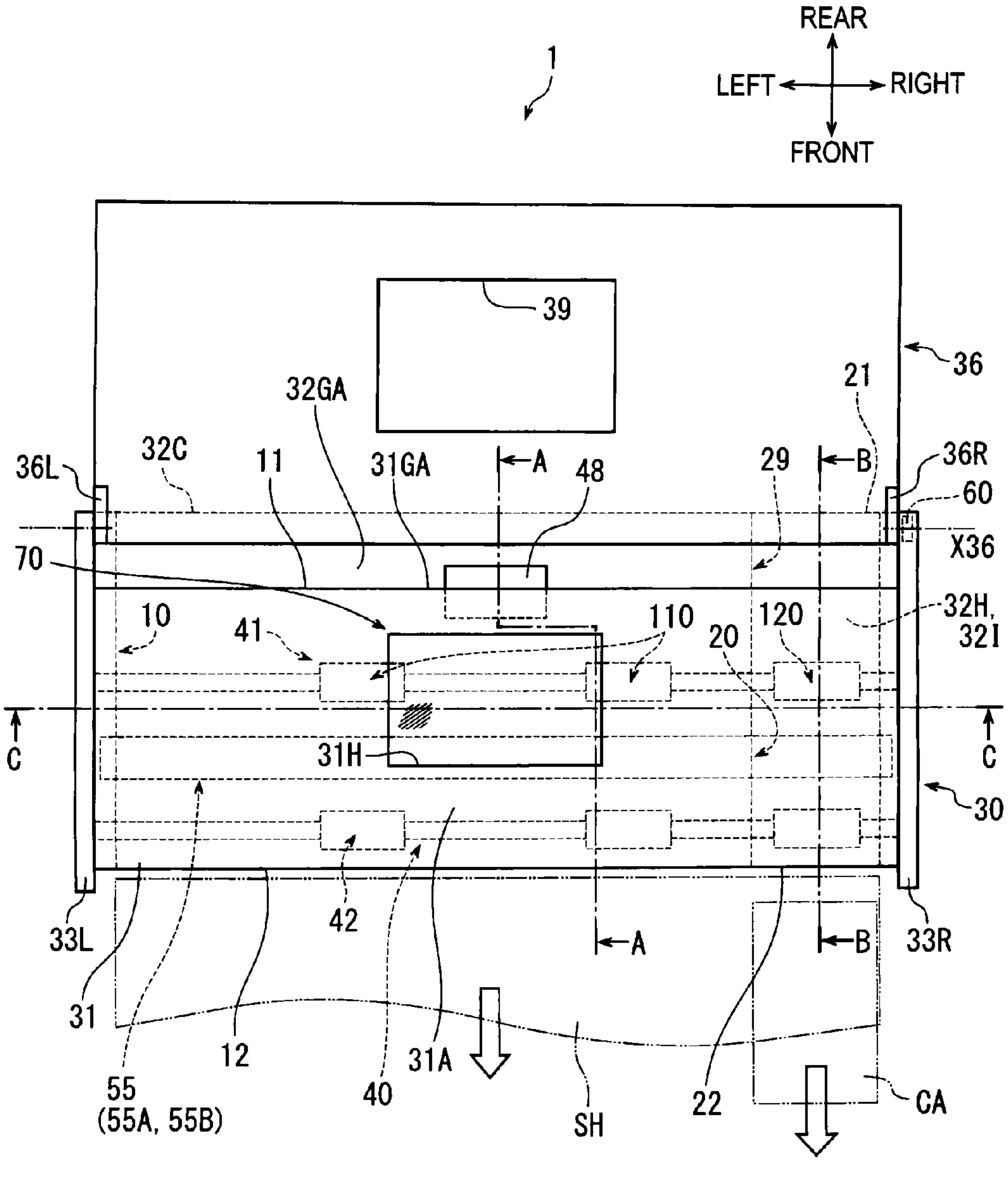
FIG. 5 is a plan view illustrating the image reading apparatus 1 at a state where the tray 36 is located at the open position.

As shown in FIGS. 5 and 7, the second housing 32 has a lower side card guide surface 32I and an upper side card guide surface 32H. The lower side card guide surface 32I continues to a part of the lower side guide surface 32G, extends to the rear direction, and reaches the rear surface 32C. The upper side card guide surface 32H is spaced upwards from the lower side card guide surface 32I. The upper side card guide surface 32H is parallel with the lower side card guide surface 32I, extends to the rear direction, and reaches the rear surface 32C. As shown in FIG. 7, a height of the upper side card guide surface 32H in the upper-lower direction is substantially the same as a height of a part of the upper side guide surface 31G in the upper-lower direction.

As shown in FIGS. 1 to 3 and 5 to 7, the housing 30 is formed with a first introduction opening 11, a first discharge opening 12 and a conveyance path 10.

As shown in FIGS. 3, 6, and 7, a sheet SH is introduced into the first introduction opening 11. The sheet SH is a sheet, an OHP sheet and the like. The first introduction opening 11 is formed between the first housing 31 and the second housing 32. More specifically, the first introduction opening 11 is a slit between a rear end edge 31GA of the upper side guide surface 31G and a rear end edge 32GA of the lower side guide surface 32G. The first introduction opening 11 extends in the left-right direction from a vicinity of the left side frame 33L to a vicinity of the right side frame 33R. A length of the first introduction opening 11 in the left-right direction is larger than a width of the sheet SH.

The sheet SH is discharged from the first discharge opening 12. The first discharge opening 12 is formed between the first housing 31 and the second housing 32. More specifically, the first discharge opening 12 is a slit between the lower end edge 31BA of the front surface 31B and the upper end edge 32BA of the front surface 32B. The first discharge opening 12 extends in the left-right direction from a vicinity of the left side frame 33L to a vicinity of the right side frame 33R. A length of the first discharge opening 12 in the left-right direction is larger than the width of the sheet SH, like the first introduction opening 11.

As shown in FIGS. 6 and 7, the conveyance path 10 guides the sheet SH from the first introduction opening 11 towards the first discharge opening 12. Thus, the sheet SH is fed along the conveyance path 10. The conveyance path 10 is formed between the first housing 31 and the second housing 32. More specifically, the conveyance path 10 is a passage that is formed between the upper side guide surface 31G and the lower side guide surface 32G with being sandwiched in the upper-lower direction. In this disclosure, the description 'the sheet SH is guided to the upper side guide surface 31G or lower side guide surface 32G' does not necessarily mean that the sheet SH is conveyed with contacting the upper side guide surface 31G or lower side guide surface 32G all the time. Therefore, for example, the description of the 'guide' also includes a configuration where the sheet SH is conveyed with occasionally contacting the lower side guide surface 32G. The conveyance path 10 is inclined downwards from the first introduction opening 11 towards the front. The conveyance path 10 is bent toward the front direction at the center of the housing 30 in the front-rear direction and extends to the first discharge opening 12.

In this illustrative embodiment, a width direction of the sheet SH that is guided on the conveyance path 10 is the left-right direction. Also, in this illustrative embodiment, one end side in the width direction of the sheet SH is a right end side and the other side in the width direction of the sheet SH is a left end side.

As shown in FIGS. 5 and 7, an area that is located at the right end side of the conveyance path 10, i.e., the one end side in the width direction of the sheet SH is a card conveyance area 20. The card conveyance area 20 is an example of the 'conveyance area' of this disclosure.

As shown in FIGS. 1 to 3, 5 and 7, the housing 30 is formed with a second introduction opening 21, a second discharge opening 22 and a card passing path 29.

Figure 2:
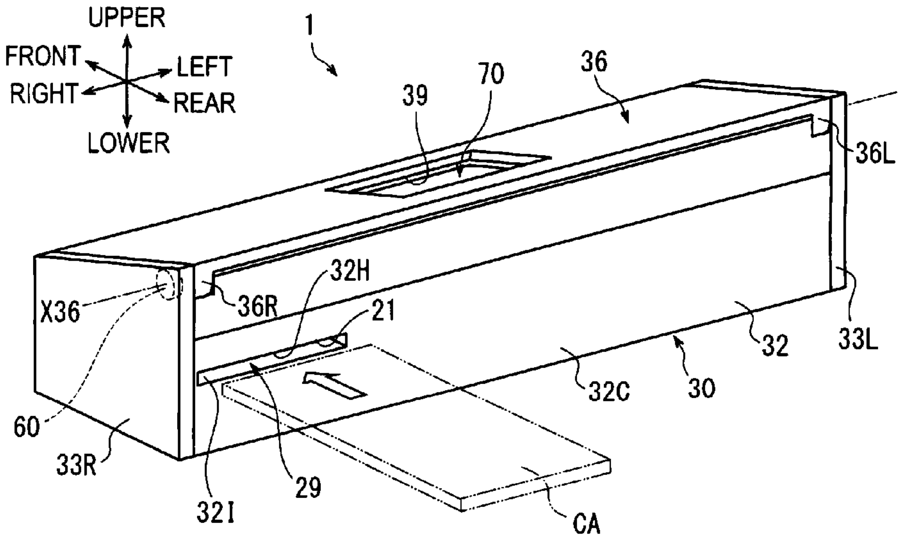
FIG. 2 is a rear perspective view illustrating the image reading apparatus 1.

As shown in FIGS. 2, 5 and 7, a card CA narrower than the sheet SH is introduced into the second introduction opening 21. The card CA has an area smaller than the sheet SH. The card CA is a name card, a cash card, a membership card, a license or the like, for example. A length of a short side of the card CA is, for example, 53.98 mm of the international standard ID-1 defined by the international standardization organization (ISO)/international electro-technical commission (IEC). A length of a long side of the card CA is, for example, 85.60 mm of the international standard ID-1 defined by the international standardization organization (ISO)/international electro-technical commission (IEC). The card CA is thicker and more rigid than the sheet SH. The card CA is an example of the 'second medium' of this disclosure. The second introduction opening 21 is formed in the second housing 32. More specifically, the second introduction opening 21 is opened in the front-rear direction at a central portion of the rear surface 32C in the upper-lower direction and at the right side frame 33R-side. The second introduction opening 21 extends in the left-right direction. A length of the second introduction opening 21 in the left-right direction is longer than the width of the card CA and narrower than the width of the sheet SH. A height of the second introduction opening 21 in the upper-lower direction is substantially the same as heights of the conveyance path 10 and the first discharge opening 12 in the upper-lower direction.

As shown in FIGS. 1, 3, 5 and 7, the card CA is discharged from the second discharge opening 22. The second discharge opening 22 is formed between the first housing 31 and the second housing 32. More specifically, the second discharge opening 22 is a slit between a right end portion 31BB of the lower end edge 31BA of the front surface 31B and a right end portion 32BB of the upper end edge 32BA of the front surface 32B. The second discharge opening 22 is elongated leftwards from the vicinity of the right side frame 33R. A length of the second discharge opening 22 in the left-right direction is also longer than the width of the card CA, like the second introduction opening 21. The second discharge opening 22 is used in common with a part of the right end side of the first discharge opening 12.

That is, as shown in FIG. 1, the first discharge opening 12 includes a lower area 22A of the second discharge opening 22. Therefore, the sheet SH can pass through the lower area 22A of the second discharge opening 22 and then can be discharged from the lower area 22A of the second discharge opening 22. The card CA may be discharged from the lower area 22A of the second discharge opening 22 or from the lower area 22A of the second discharge opening 22 and the upper area 22B of the second discharge opening 22. Like this, in this disclosure, the descriptions of the 'first' discharge opening and the 'second' discharge opening also include a configuration where the first discharge opening includes the second discharge opening. Likewise, the descriptions of the 'first' introduction opening and the 'second' introduction opening also include a configuration where the first introduction opening includes the second introduction opening.

An opening width W2 of the second discharge opening 22 in the upper-lower direction is larger than an opening width W1 of the first discharge opening 12 in the upper-lower direction, in correspondence to a range of the thickness of the card CA.

As shown in FIGS. 5 and 7, the card passing path 29 is a passage that is formed between the upper side card guide surface 32H and the lower side card guide surface 32I with being sandwiched in the upper-lower direction. The card passing path 29 and the card conveyance area 20 located at the right end side of the conveyance path 10 extend from the second introduction opening 21 of the rear to the second discharge opening 22 of the front. The card passing path 29 and the card conveyance area 20 guide the card CA from the second introduction opening 21 towards the second discharge opening 22.

As shown in FIGS. 3 and 5, a pair of hinge parts 36L, 36R is integrally formed with left and right corner portions of the tray 36. A center of the tray 36 is formed with an operation opening 39 that is opened upwards. The tray 36 is supported to both side frames 33L, 33R via both hinge part 36L, 36R so that it can be rotated about an opening/closing shaft center X36. The opening/closing shaft center X36 is positioned at rear upper end portions of the side frames 33L, 33R and extends in the left-right direction.

As shown in FIGS. 1, 2 and 7, at a close state, the tray 36 covers the upper surface 31A of the first housing 31 from the upper. The position of the tray 36 shown in FIGS. 1, 2 and 7 is referred to as a 'close position.' When the tray 36 is located at the close position, the tray 36 is located so that it is inclined downwards from the opening/closing shaft center X36 towards the front. As shown in FIG. 1, the operation opening 39 exposes the touch panel 70 to the outside at a state where the tray 36 is located at the close position.

As shown in FIGS. 3, 5 and 6, the tray 36 is rotated rearwards from the state shown in FIG. 1 and the like about the opening/closing shaft center X36 and is thus opened, so that the tray 36 is displaced to a position at which tray 36 is upwards inclined towards the rear at the rear side of the housing 30. A position of the tray 36 shown in FIGS. 3, 5 and 6 is referred to as an 'open position.'

As shown in FIGS. 3 and 6, at the open position, the tray 36 is inclined so that it continues to the inclined part of the lower side guide surface 32G, and opens the first introduction opening 11. One or more sheets SH are put on the tray 36. Although not shown, the tray 36 has a pair of left and right guide parts. The guide parts sandwich the sheet SH put on the tray 36 from the outer sides in the left-right direction and position the sheet in the left-right direction. The sheet SH put on the tray 36 is introduced into the first introduction opening 11 and is guided towards the first discharge opening 12 on the conveyance path 10.

Figure 4:
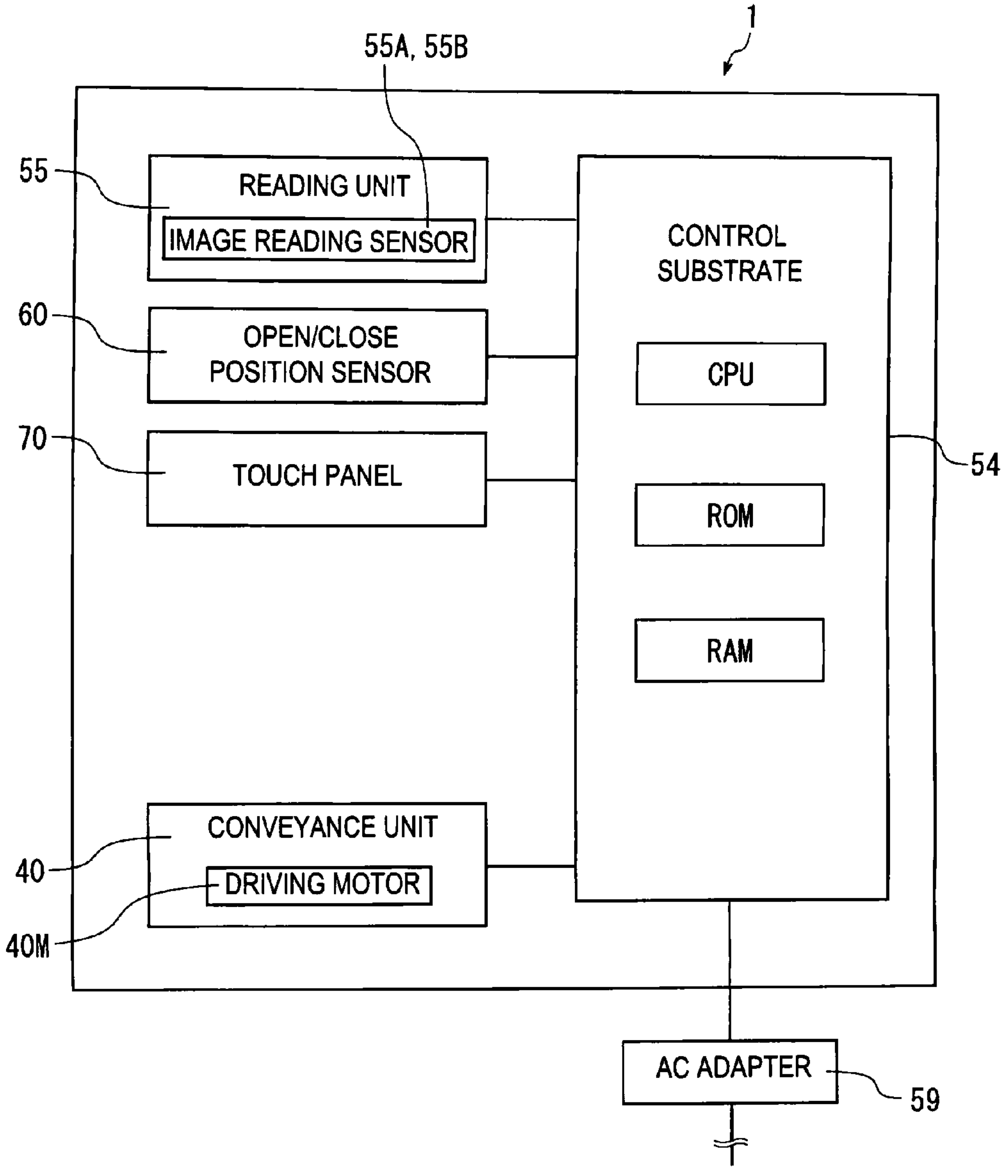
FIG. 4 is a block diagram of the image reading apparatus 1.

As shown in FIGS. 4, 6 and 7, power is fed from a household wall outlet (not shown) to the conveyance unit 40, the reading unit 55, the touch panel 70, the open/close position sensor 60 and the like via an AC adapter 59 and the control substrate 54.

As shown in FIG. 4, the control substrate 54 has a CPU, a ROM, a RAM, and the like. The control substrate 54 is electrically connected to the conveyance unit 40, the reading unit 55, the touch panel 70, the open/close position sensor 60, and the like and controls the same.

As shown in FIGS. 5 to 7, the conveyance unit 40 has a separation roller 48, a separation pad 49, an upstream-side conveyance unit 41, and a downstream-side conveyance unit 42. The reading unit 55 has image reading sensors 55A, 55B. They are arranged on the conveyance path 10 in order of the separation roller 48, the separation pad 49, the upstream-side conveyance unit 41, the image reading sensors 55A, 55B and the downstream-side conveyance unit 42 from the first introduction opening 11 towards the first discharge opening 12. In the below, the configurations thereof are described in corresponding order.

As shown in FIG. 6, the separation roller 48 is rotatably supported in the second housing 32. An upper part of the separation roller 48 is exposed to the conveyance path 10 through the inclined part of the lower side guide surface 32G. As shown in FIG. 5, the separation roller 48 is positioned at the center of the conveyance path 10 in the left-right direction. The separation roller 48 is driven by a driving motor 40M shown in FIG. 4 as the control circuit 54 controls the driving motor 40M. The separation roller 48 rotates with contacting the sheet SH put on the tray 36, thereby conveying the sheet SH towards the conveyance path 10.

The separation pad 49 is mounted on the first housing 31. The separation pad 49 is exposed to the conveyance path 10 on the upper side guide surface 31G. The separation pad 49 is a plate-shaped member consisting of a friction member made of rubber, elastomer and the like. The separation pad 49 is biased by a biasing member (not shown) and is thus pressed to the separation roller 48. Thereby, the separation roller 48 and the separation pad 49 can hold and separate the sheet SH, which is conveyed on the conveyance path 10, one by one therebetween.

As shown in FIGS. 5 to 7, the upstream-side conveyance unit 41 is provided at a downstream side on the conveyance path 10 from the separation roller 48 in the housing 10, i.e. at a side facing the first discharge opening 12 and an upstream side on the conveyance path 10 from the image reading sensors 55A, 55B, i.e., a side facing the first introduction opening 11.

As shown in FIGS. 5 and 8 to 10, the upstream-side conveyance unit 41 has a pair of first conveyance rollers 110 and a pair of second conveyance rollers 120. The pair of first conveyance rollers 110 is located at the outside of the card conveyance area 20 and conveys the sheet SH on the conveyance path 10. The pair of second conveyance rollers 120 is located in the card conveyance area 20 and conveys the card CA in the card conveyance area 20 of the conveyance path 10.

Figure 8:
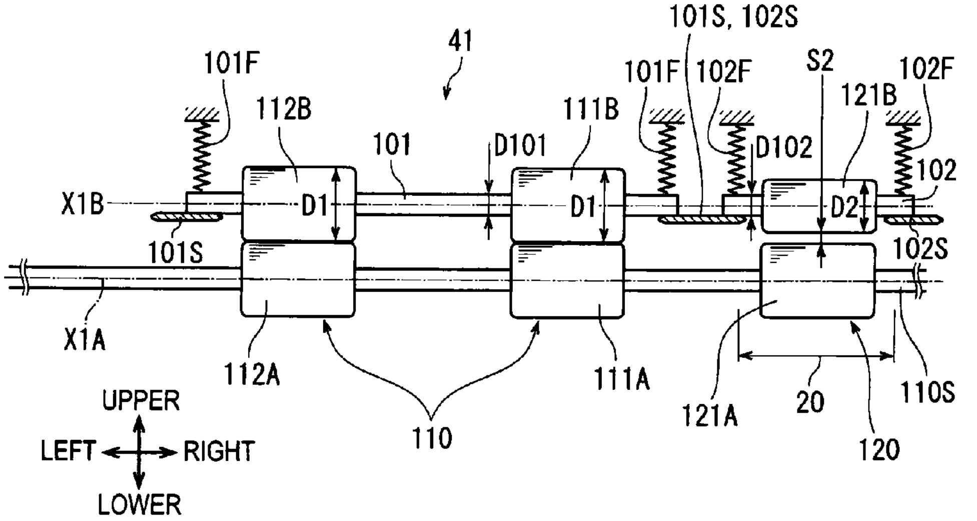
FIG. 8 is a schematic sectional view taken along a line C-C of FIG. 5, showing a pair of first conveyance rollers 110 and a pair of second conveyance rollers 120.

More specifically, as shown in FIG. 8, the pair of first conveyance rollers 110 has two pairs of rollers. That is, the pair of first conveyance rollers 110 has a first driving roller 111A, a first pinch roller 111B, a first driving roller 112A and a first pinch roller 112B. The first driving roller 111A and the first pinch roller 111B are positioned between the separation roller 48 and the card conveyance area 20 in the left-right direction. The first driving roller 112A and the first pinch roller 112B are positioned at the left of the separation roller 48 in the left-right direction. The first driving rollers 111A, 112A and the first pinch rollers 111B, 112B are positioned at the outside of the card conveyance area 20.

As shown in FIG. 5, the pair of second conveyance rollers 120 is positioned at the right of the separation roller 48 and the pair of first conveyance rollers 110 in the left-right direction. As shown in FIG. 8, the pair of second conveyance rollers 120 has a second driving roller 121A and a second pinch roller 121B. The second driving roller 121A and the second pinch roller 121B are positioned in the card conveyance area 20.

As shown in FIGS. 6 and 7, upper parts of the first driving rollers 111A, 112A and the second driving roller 121A are exposed to the conveyance path 10 from a connection part of the inclined part and not-inclined part of the lower side guide surface 32G. Lower parts of the first pinch rollers 111B, 112B and the second pinch roller 121B are exposed to the conveyance path 10 from a connection part of the inclined part and not-inclined part of the upper side guide surface 31G.

The first driving rollers 111A, 112A and the second driving roller 121A have the same outer diameter. As shown in FIG. 8, the second pinch roller 121B has an outer diameter D2 smaller than the outer diameter D1 of the first pinch rollers 111B, 112B. A friction coefficient μ2 of the second pinch roller 121B is smaller than a friction coefficient μ1 of the first pinch rollers 111B, 112B.

As shown in FIG. 8, the first driving rollers 111A, 112A and the second driving roller 121A are integrally rotatably attached to one driving shaft 1105 in the second housing 32. The driving shaft 110S defines a driving shaft center X1A parallel with the left-right direction.

A first driven shaft 101 are supported to the first housing 31. The first pinch rollers 111B, 112B is rotatable relative to the first driven shaft 101. A second driven shaft 102 is supported to the first housing 31. The second pinch rollers 121B can rotate relative to a second driven shaft 102. An outer diameter D101 of the first driven shaft 101 and an outer diameter D102 of the second driven shaft 102 are the same.

The first driven shaft 101 is connected with biasing springs 101F. The biasing springs 101F bias the first driven shaft 101 towards the driving shaft center X1A, so that the first pinch rollers 111B, 112B are biased towards the first driving rollers 111A, 112A. The second pinch roller 121B is connected with biasing springs 102F. The biasing springs 102F bias the second driven shaft 102 towards the driving shaft center X1A, so that the second pinch roller 121B is biased towards the second driving roller 121A. Incidentally, it is not necessary to bias the second pinch roller 121B towards the second driving roller 121A.

The first housing 31 is provided with a first bearing 101S and a second bearing 102S. The first bearing 101S contacts the first driven shaft 101, which is biased by the biasing springs 101F, from a side of the driving shaft center X1A to thus support the first driven shaft 101 at a state where the first driving rollers 111A, 112A and the first pinch rollers 111B, 112B do not hold the sheet SH therebetween. The second bearing 102S contacts the second driven shaft 102, which is biased by the biasing springs 102F, from a side of the driving shaft center X1A to thus support the second driven shaft 102 at a state where the second driving roller 121A and the second pinch roller 121B do not hold the card CA therebetween. At this state, the first driven shaft 101 and the second driven shaft 102 define a driven shaft center X1B parallel with the driving shaft center X1A. That is, the first pinch rollers 111B, 112B and the second pinch roller 121B can rotate about the driven shaft center X1B at a state where they do not contact the sheet SH or card CA.

A position at which the first bearing 101S contacts the first driven shaft 101 and a position at which the second bearing 102S contacts the second driven shaft 102 are corresponding to each other. That is, a distance that the first driven shaft 101 supported to the first bearing 101S is spaced from the driving shaft center X1A and a distance that the second driven shaft 102 supported to the second bearing 102S is spaced from the driving shaft center X1A are the same.

Since the outer diameter D101 of the first driven shaft 101 and the outer diameter D102 of the second driven shaft 102 are the same, the first driven shaft 101 supported to the first bearing 101S and the second driven shaft 102 supported to the second bearing 102S define the first driven shaft center X1B.

As shown in FIG. 8, a gap S2 is formed at a state where the second driving roller 121A and the second pinch roller 121B do not hold the card CA therebetween. The gap S2 is smaller than a thickness T2 of the card CA shown in FIG. 10 and larger than a thickness T1 of the sheet SH shown in FIG. 9. The thickness T1 of the sheet SH is about 0.08 to 0.12 mm when the sheet SH is a normal sheet and about 0.2 mm when it is a cardboard. The thickness T2 of the card CA is about 0.76 mm when the card CA is an ISO standard product.

Figure 9:
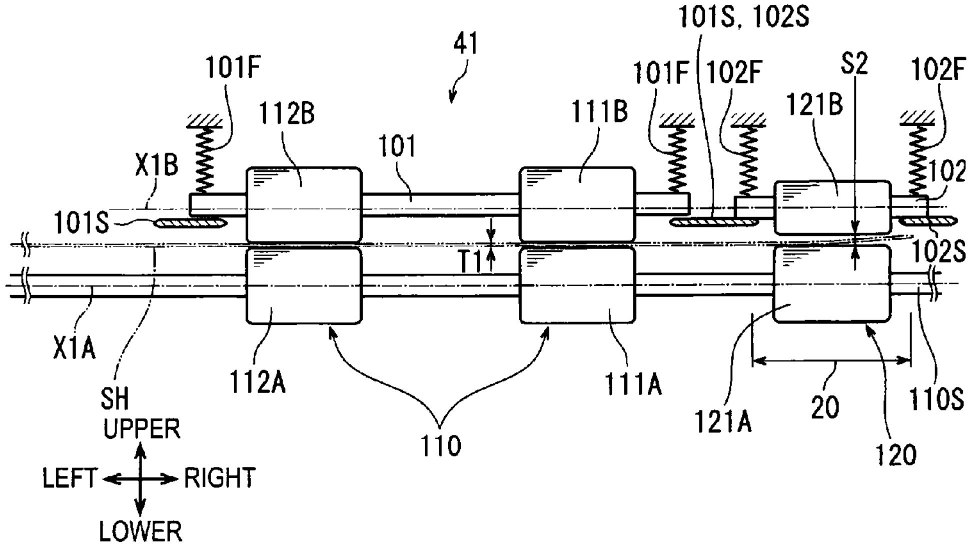
FIG. 9 is the schematic sectional view taken along a line C-C of FIG. 5, showing the pair of first conveyance rollers 110 conveying a sheet SH and the pair of second conveyance rollers 120.
Figure 10:
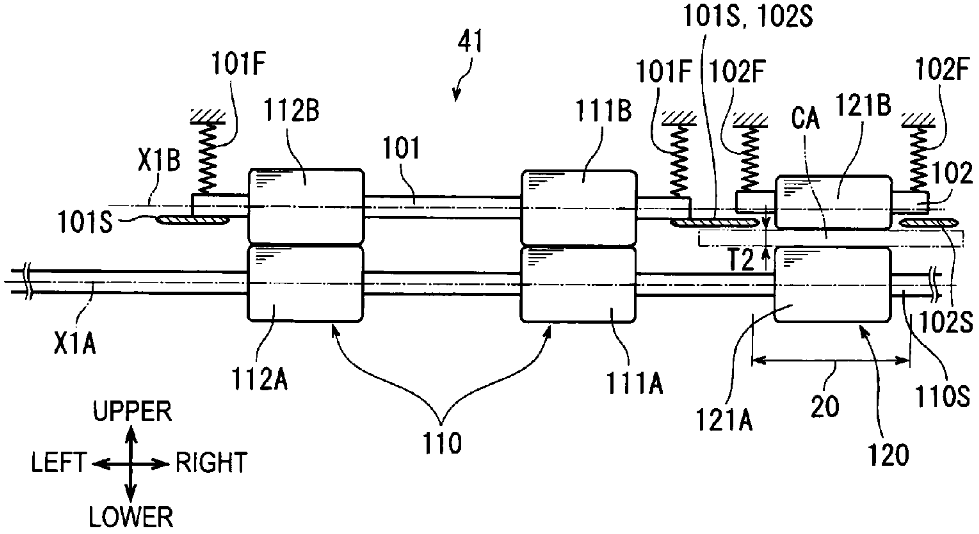
FIG. 10 is the schematic sectional view taken along a line C-C of FIG. 5, showing the pair of first conveyance rollers 110 and the pair of second conveyance rollers 120 conveying a card CA.

As shown in FIG. 9, the first pinch rollers 111B, 112B contact the sheet SH and then the biasing springs 101F are compressed and moved in parallel, so that the first pinch rollers 111B, 112B are spaced from the driving shaft center X1A. As shown in FIG. 10, the second pinch roller 121B contacts the card CA and the biasing springs 102F are compressed and moved in parallel, so that the second pinch roller 121B is spaced from the driving shaft center X1A. At this time, since the gap S2 is smaller than the thickness T2 of the card CA, the second driving roller 121A and the second pinch roller 121B can securely hold the card CA therebetween.

The first driving rollers 111A, 112A and the second driving roller 121A are rotated about the driving shaft center X1A by the driving motor 40M when the control substrate 54 controls the driving motor 40M.

As shown in FIGS. 8 and 9, the first pinch rollers 111B, 122B are biased towards the first driving rollers 111A, 112A. The first pinch rollers 111B, 121B are driven and rotated by the first driving rollers 111A, 112A with holding the sheet SH together with the first driving rollers 111A, and 112A. Thereby, when the sheet SH is conveyed, the first driving rollers 111A, 112A and the first pinch rollers 111B, 121B are rotated with holding the sheet SH being conveyed on the conveyance path 10, thereby conveying the sheet SH towards the first discharge opening 12. At this time, since the gap S2 is larger than the thickness T1 of the sheet SH, the right end portion of the sheet SH is unlikely to contact the second pinch roller 121B.

As shown in FIG. 10, the second pinch roller 121B that is biased towards the second driving roller 121A is driven and rotated by the second driving roller 121A with holding the card CA together with the second driving roller 121A. Thereby, when the card CA is conveyed, the second driving roller 121A and the second pinch roller 121B are rotated with holding the card CA, which is introduced from the second introduction opening 21 and passes through the card passing path 29, in the card conveyance area 20, thereby conveying the card CA towards the second discharge opening 22.

As shown in FIGS. 5 to 7, the image reading sensor 55A is mounted on the second housing 32. For example, the image reading sensor 55A has a CIS (Contact Image Sensor), a CIS holder, a contact glass, and the like. An upper surface of the image reading sensor 55A is exposed to the conveyance path 10 at the horizontal part of the lower side guide surface 32G. The image reading sensor 55B is mounted on the first housing 31. For example, the image reading sensor 55*b* has a CIS, a CIS holder, a contact glass, and the like. A lower surface of the image reading sensor 55B is exposed to the conveyance path 10 at the horizontal part of the upper side guide surface 31G. That is, the image reading sensors 55A, 55B face with each other so that they sandwich the conveyance path 10 including the card conveyance area 20 from the upper-lower direction. According to the above configuration, the image reading sensors 55A, 55B read images of both sides of the sheet SH being conveyed on the conveyance path 10 and images of both sides of the card CA being conveyed in the card conveyance area 20. That is, the image reading sensors 55A, 55B read the images of both sides of the sheet SH when the sheet SH is conveyed and read the images of both sides of the card CA when the card CA is conveyed. Meanwhile, in this disclosure, the 'opposed' does not necessarily mean the 'truly opposed'. For example, a part of the image reading sensor 55A may deviate relative to the image reading sensor 55B in the conveyance direction of the sheet SH.

As shown in FIGS. 5 to 7, the downstream-side conveyance unit 42 is provided at a downstream-side on the conveyance path 10 from the image reading sensors 55A, 55B in the housing 30, i.e., at a side of the first discharge opening 12.

In this illustrative embodiment, the downstream-side conveyance unit 42 has the same configuration as that of the upstream-side conveyance unit 41 and just has a different mounting position in the housing 30. That is, the downstream-side conveyance unit 42 has a pair of first conveyance rollers and a pair of second conveyance rollers having the same configurations as those of the pair of first conveyance rollers 110 and the pair of second conveyance rollers 120 of the upstream-side conveyance unit 41. Therefore, the detailed descriptions of the downstream-side conveyance unit 42 will be omitted.

The pair of first conveyance rollers of the downstream-side conveyance unit 42 are driven by the driving motor 40M when the control substrate 54 controls the driving motor 40M and are rotated with holding the sheet SH being conveyed on the conveyance path 10, after that the sheet SH is discharged from the first discharge opening 12 to the outside of the housing 30. Also, the pair of second conveyance rollers of the downstream-side conveyance unit 42 are rotated with holding the card CA, which has passed through the card passing path 29 and of which the images thereof have been read in the card conveyance area 20, the card CA is discharged from the second discharge opening 22 to the outside of the housing 30.

As shown in FIGS. 3 and 6, for example, the touch panel 70 is mounted to a side of the upper surface 31A in the first housing 31. The touch panel 70 is exposed to the outside through a rectangular opening 31H for a touch panel formed on the upper surface 31A. The touch panel 70 has a liquid crystal panel, a light source such as fluorescent lamp and LED, which illuminates light from a backside of the liquid crystal panel, and a contact detection film that is adhered on a surface of the liquid crystal panel.

The touch panel 70 is controlled by the control substrate 54 and displays an operating status and the like of the image reading apparatus 1 such as a processing status of an image reading operation and an error status. The touch panel 70 also receives an operation from the outside. Specifically, the touch panel 70 displays a variety of buttons such as a 'START' button B1 shown in FIG. 1. When a user contacts the touch panel 70 so as to input an execution instruction of processing or a setting corresponding to any one button, the touch panel 70 receives the corresponding operation and transmits the received operation to the control substrate 54.

As shown in FIGS. 1 and 3, for example, the open/close position sensor 60 is to detect a position of the tray 36 relative to the housing 30. More specifically, the open/close position sensor 60 is provided at a rear upper end portion of the right side frame 33R and is thus adjacent to the right hinge part 36R. The open/close position sensor 60 is configured by a micro switch, a rotary switch, and the like and is connected or disconnected as the tray 36 is rotated about the opening/closing shaft center X36. The open/close position sensor 60 detects that the tray 36 is located at the open position and transmits a detection signal thereof to the control substrate 54.

<Image Reading Operation of Card and Sheet>

The image reading apparatus 1 reads images of the card CA and the sheet SH, as follows.

When reading images of the sheet SH, a user keeps the tray 36 at the open position if the tray is located at the open position and moves the tray 36 to the open position if the tray is located at the close position. Then, the user puts the sheet SH on the tray 36 at the open position. When a reading instruction of the sheet SH is input from the touch panel 70, the control substrate 54 starts to read the images of the sheet SH. The sheet reading instruction of the touch panel 70 is generated as a sheet reading 'START' button displayed on the touch panel 70 is pressed, and then it is transmitted to the control substrate 54. Although not shown, the sheet reading 'START' button is the same as the card reading 'START' button B1 shown in FIG. 1.

Then, after the control substrate 54 confirms that the open/close position sensor 60 detects that the tray 36 is located at the open position and a sheet sensor (not shown) detects that the sheet SH is put on the tray 36, the control substrate 54 controls the driving motor 40M of the conveyance unit 40. Thereby, the separation roller 48 is rotated with holding the sheet SH between the separation roller 48 and the separation pad 49. The separation roller 48 introduces the sheet SH on the tray 36 through the first introduction opening 11 and delivers the sheet SH onto the conveyance path 10. At this time, when a plurality of the sheets SH is conveyed with being overlapped, the sheets SH can be separated one by one by a frictional force and the like between the separation pad 49 and the sheet SH.

Then, the pair of first conveyance rollers 110 of the upstream-side conveyance unit 41 conveys the sheet SH delivered to the separation roller 48 on the conveyance path 10 by the first driving rollers 111A, 112A and the first pinch rollers 111B, 112B. The images of both sides of the sheet SH that is conveyed on the conveyance path 10 are read by the image reading sensors 55A, 55B. The sheet SH of which the images have been read is discharged to the outside of the housing 30 through the first discharge opening 12 by the pair of first conveyance rollers of the downstream-side conveyance unit 42.

In the meantime, when reading images of the card CA, the user displaces the tray 36 to the close position if the tray is located at the open position and keeps the tray 36 at the close position if the tray is located at the close position. Then, as shown in FIG. 2, the user inserts the card CA into the second introduction opening 22 from the rear of the housing 30. Then, the card CA passes through the card passing path 29 and a tip thereof reaches the card conveyance area 20. When a reading instruction of the card CA is input from the touch panel 70, the control substrate 54 starts to read the images of the card CA. The card reading instruction of the touch panel 70 is generated as a card reading 'START' button B1 displayed on the touch panel 70 is pressed, and then it is transmitted to the control substrate 54.

Then, after the control substrate 54 confirms that a card sensor (not shown) detects that there is card CA in the second introduction opening 22, the control substrate 54 controls the driving motor 40M of the conveyance unit 40. Thereby, the pair of second conveyance rollers 120 of the upstream-side conveyance unit 41 conveys the card CA in the card conveyance area 20 by the second driving roller 121A and the second pinch roller 121B. The images of both sides of the card CA that is conveyed in the card conveyance area 20 are read by the image reading sensors 55A, 55B. The card CA of which the images have been read is discharged to the outside of the housing 30 through the first discharge opening 12 by the pair of second conveyance rollers of the downstream-side conveyance unit 42.

<Operational Effects>

According to the image reading apparatus 1 of the first illustrative embodiment, the pair of first conveyance rollers 110 and the pair of second conveyance rollers 120 are operated to convey the sheet SH and the card CA having the different widths on the conveyance path 10.

According to the image reading apparatus 1, the first driving rollers 111A, 112A and the first pinch rollers 111B, 112B are located at the outside of the card conveyance area 20 in the left-right direction. Thus, when conveying the card CA, the first driving rollers 111A, 112A and the first pinch rollers 111B, 112B do not contact the card CA, and the second driving roller 121A and the second pinch roller 121B can contact the card CA. As a result, in the image reading apparatus 1, a situation in that the conveyance resistances acting on the card CA are unbalanced is unlikely to occur.

Hence, according to the image reading apparatus 1 of the first illustrative embodiment, it is possible to convey the sheet SH and the card CA having the different widths and to suppress the skew of the card CA in the card conveyance area 20 of the conveyance path 10.

According to the image reading apparatus 1, the second pinch roller 121B has the outer diameter D2 smaller than the outer diameter D1 of the first pinch rollers 111B, 112B, and the first pinch rollers 111B, 112B and the second pinch roller 121B are rotatably supported about the same driven shaft center X1B. Therefore, when the sheet SH thinner than the card CA is conveyed, the sheet SH is unlikely to contact the second pinch roller 121B. When the sheet SH contacts the second pinch roller 121B, the conveyance resistance is applied from the second pinch roller 121B to the sheet SH, so that the sheet SH may serpentine. However, according to the image reading apparatus 1, since the sheet SH is unlikely to contact the second pinch roller 121B, it is possible to suppress the skew of the sheet SH.

According to the image reading apparatus 1, the gap S2 that is formed between the second driving roller 121A and the second pinch roller 121B is smaller than the thickness T2 of the card CA, so that the second driving roller 121A and the second pinch roller 121B can securely hold the card CA therebetween. Also, the gap S2 is larger than the thickness T1 of the sheet SH, so that the sheet SH is unlikely to contact the second pinch roller 121B. Thereby, the conveyance resistance is unlikely to act on the sheet SH from the second pinch roller 121B. As a result, according to the image reading apparatus 1, it is possible to suppress the skew of the sheet SH that is conveyed on the conveyance path 10.

According to the image reading apparatus 1, when the sheet SH is curled in the left-right direction, for example, the right end edge of the sheet SH is easy to contact the second pinch roller 121B, as shown in FIG. 9. Even in this case, the friction coefficient μ2 of the second pinch roller 121B is smaller than the friction coefficient μ1 of the first pinch rollers 111B, 112B, so that the conveyance resistance acting on the right end edge of the sheet SH from the second pinch roller 121B is reduced. As a result, according to the image reading apparatus 1, it is possible to securely suppress the skew of the sheet SH that is conveyed on the conveyance path 10.

According to the image reading apparatus 1, the first driven shaft 101 and the second driven shaft 102 are respectively biased towards the driving shaft center X1A. When the first driving rollers 111A, 112A and the first pinch rollers 111B, 112B hold the sheet SH therebetween, the first driven shaft 101 is moved in parallel. When the second driving roller 121A and the second pinch roller 121B hold the card CA therebetween, the second driven shaft 102 is moved in parallel. Thereby, according to the image reading apparatus 1, the first pinch rollers 111B, 112B and the second pinch roller 121B do not influence each other when the first driving rollers 111A, 112A and the first pinch rollers 111B, 112B hold the sheet SH therebetween and when the second driving roller 121A and the second pinch roller 121B hold the card CA therebetween. Therefore, it is possible to favorably convey the sheet SH and the card CA having the different widths on the conveyance path 10.

According to the image reading apparatus 1, the outer diameter D101 of the first driven shaft 101 and the outer diameter D102 of the second driven shaft 102 are the same, and the position at which the first bearing 101S contacts the first driven shaft 101 and the position at which the second bearing 102S contacts the second driven shaft 102 are the same. Thereby, according to the image reading apparatus 1, it is possible to form the first bearing 101S and the second bearing 102S into a flat plate shape. Therefore, it is possible to reduce the size of the first bearing 101S and the second bearing 102S from increasing, compared to a configuration where the first bearing 101S and the second bearing 102S have a stepped shape. As a result, according to the image reading apparatus 1, it is possible to suppress the skew of the sheet SH and the card CA while securely making the image reading apparatus thinner.

Second Illustrative Embodiment

Figure 11:
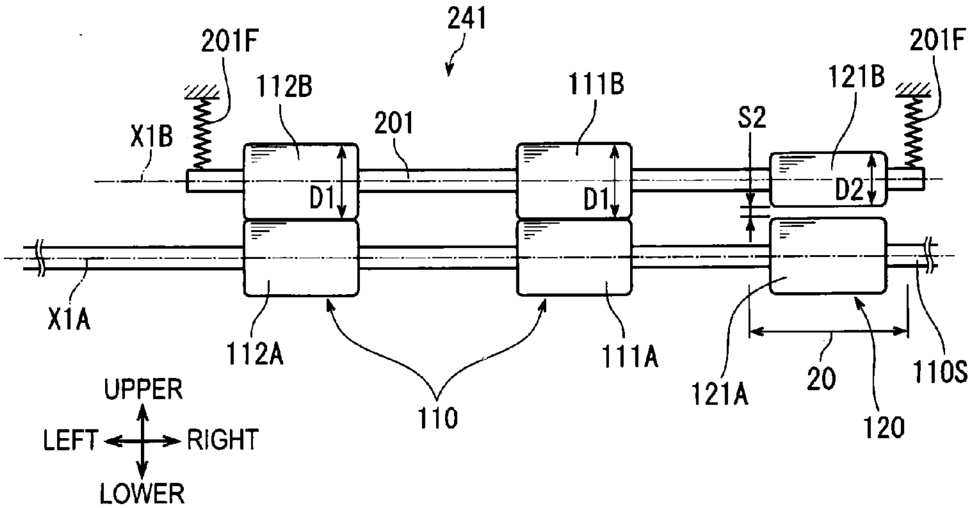
FIG. 11 is the same schematic sectional view as FIG. 8 in an image reading apparatus of a second illustrative embodiment, showing the pair of first conveyance rollers 110 and the pair of second conveyance rollers 120.

An image reading apparatus of a second illustrative embodiment adopts an upstream-side conveyance unit 241 and a downstream-side conveyance unit having the same configuration as that of the upstream-side conveyance unit 241 shown in FIG. 11, instead of the upstream-side conveyance unit 41 and the downstream-side conveyance unit 42 of the image reading apparatus 1 of the first illustrative embodiment. The other configurations of the second illustrative embodiment are the same as those of the first illustrative embodiment. Therefore, the same configurations as those of the first illustrative embodiment are denoted with the same reference numerals, and the descriptions thereof will be omitted or simplified.

In the upstream-side conveyance unit 241, the first driven shaft 101 and the second driven shaft 102 of the upstream-side conveyance unit 41 of the first illustrative embodiment are changed into a common driven shaft 201. The common driven shaft 201 has such a shape that the first driven shaft 101 and the second driven shaft 102 are integrally connected, and defines the driven shaft center X1B.

Both left and right end portions of the common driven shaft 201 are connected with biasing springs 201F. The biasing springs 201F bias the common driven shaft 201 towards the driving shaft center X1A, so that the first pinch rollers 111B, 112B and the second pinch roller 121B are biased towards the first driving rollers 111A, 112A and the second driving roller 121A.

Also in the image reading apparatus having the above configuration of the second illustrative embodiment, a situation in that the conveyance resistances acting on the card CA are unbalanced is unlikely to occur. Hence, according to the image reading apparatus of the second illustrative embodiment, it is possible to convey the sheet SH and the card CA having the different widths and to suppress the skew of the card CA in the card conveyance area 20 of the conveyance path 10.

Also, according to the image reading apparatus, it is possible to reduce the number of part and to suppress the skew of the sheet SH and the card CA, compared to a configuration where the first pinch rollers 111B, 112B and the second pinch roller 121B have the dedicated driven shafts, respectively.

Third Illustrative Embodiment

Figure 12:
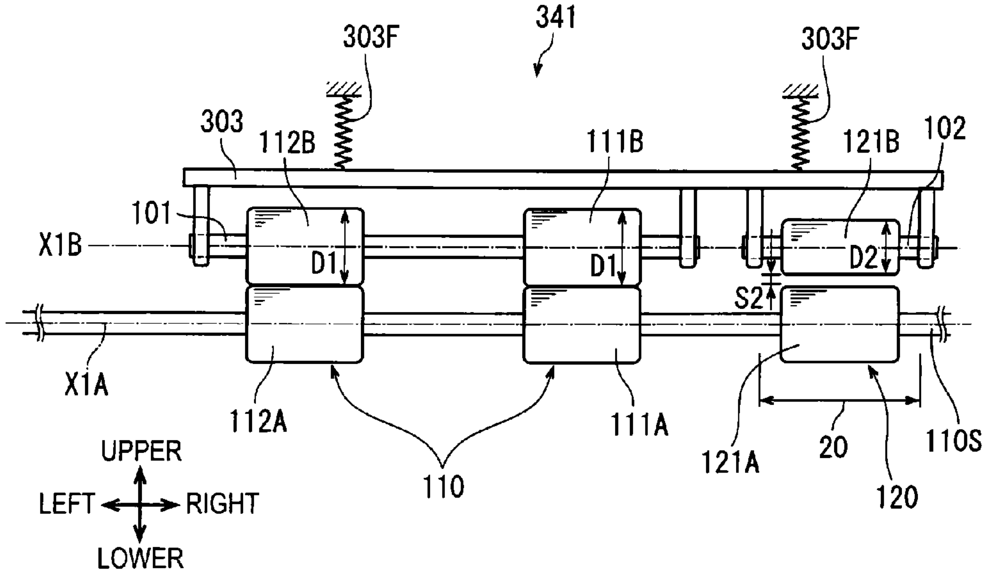
FIG. 12 is the same schematic sectional view as FIG. 8 in an image reading apparatus of a third illustrative embodiment, showing the pair of first conveyance rollers 110 and the pair of second conveyance rollers 120.

An image reading apparatus of a third illustrative embodiment adopts an upstream-side conveyance unit 341 and a downstream-side conveyance unit having the same configuration as that of the upstream-side conveyance unit 341 shown in FIG. 12, instead of the upstream-side conveyance unit 41 and the downstream-side conveyance unit 42 of the image reading apparatus 1 of the first illustrative embodiment. The other configurations of the third illustrative embodiment are the same as those of the first illustrative embodiment. Therefore, the same configurations as those of the first illustrative embodiment are denoted with the same reference numerals, and the descriptions thereof will be omitted or simplified.

The first driven shaft 101 and the second driven shaft 102 that are directly biased to the biasing springs 101F, 102F in the first illustrative embodiment are held to one holder 303 in the third illustrative embodiment. The first driven shaft 101 and the second driven shaft 102 define the driven shaft center X1B with being held to the holder 303.

The holder 303 is connected with biasing springs 303F. The biasing springs 303F bias the holder 303 towards the driving shaft center X1A, so that the first pinch rollers 111B, 112B and the second pinch roller 121B are biased towards the first driving rollers 111A, 112A and the second driving roller 121A.

Also in the image reading apparatus having the above configuration of the third illustrative embodiment, a situation in that the conveyance resistances acting on the card CA are unbalanced is unlikely to occur. Hence, according to the image reading apparatus of the third illustrative embodiment, it is possible to convey the sheet SH and the card CA having the different widths and to suppress the skew of the card CA in the card conveyance area 20 of the conveyance path 10.

Fourth Illustrative Embodiment

Figure 13:
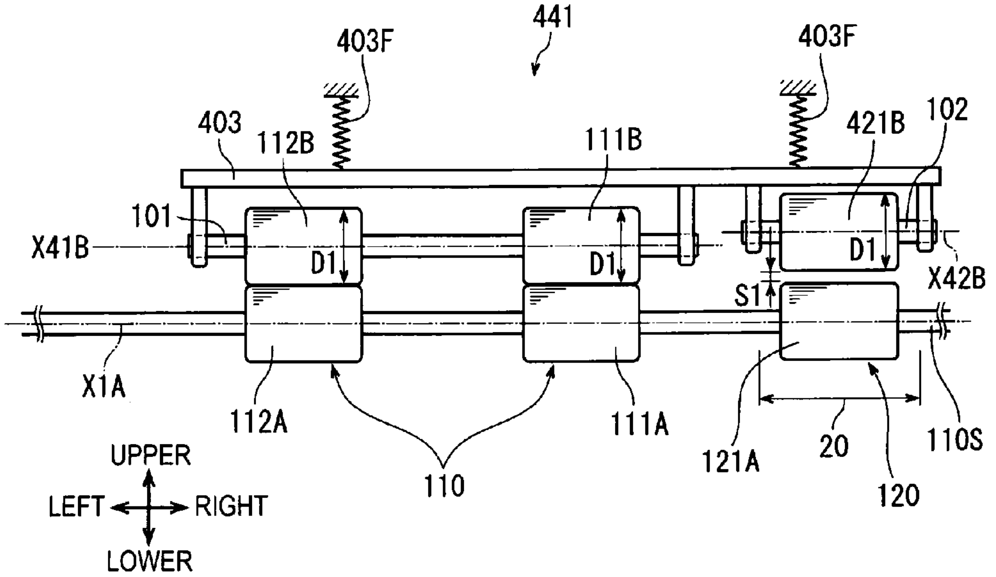
FIG. 13 is the same schematic sectional view as FIG. 8 in an image reading apparatus of a fourth illustrative embodiment, showing the pair of first conveyance rollers 110 and the pair of second conveyance rollers 120.

An image reading apparatus of a fourth illustrative embodiment adopts an upstream-side conveyance unit 441 and a downstream-side conveyance unit having the same configuration as that of the upstream-side conveyance unit 441 shown in FIG. 13, instead of the upstream-side conveyance unit 41 and the downstream-side conveyance unit 42 of the image reading apparatus of the first illustrative embodiment. The other configurations of the fourth illustrative embodiment are the same as those of the first illustrative embodiment. Therefore, the same configurations as those of the first illustrative embodiment are denoted with the same reference numerals, and the descriptions thereof will be omitted or simplified.

The first driven shaft 101 and the second driven shaft 102 that are directly biased to the biasing springs 101F, 102F in the first illustrative embodiment are held to one holder 403 in the fourth illustrative embodiment. The first driven shaft 101 defines a first driven shaft center X41B with being held to the holder 403. The second driven shaft 102 defines a second driven shaft center X42B parallel with the first driven shaft center X41B with being held to the holder 403.

In the fourth illustrative embodiment, a second pinch roller 421B is adopted instead of the second pinch roller 121B of the first illustrative embodiment. The second pinch roller 421B has the same outer diameter D1 as that of the first pinch rollers 111B, 112B. The other configurations of the second pinch roller 421B are the same as those of the second pinch roller 121B.

In correspondence to the configuration where the second pinch roller 421B has the same outer diameter D1 as that of the first pinch rollers 111B, 112B, the second driven shaft center X42B is more spaced from the driving shaft center X1A than the first driven shaft center X41B. Thereby, the gap S1 is formed between the second driving roller 121A and the second pinch roller 421B at a state where the second driving roller 121A and the second pinch roller 421B do not hold the card CA therebetween.

The holder 403 is connected with biasing springs 403F. The biasing springs 403F bias the holder 403 towards the driving shaft center X1A, so that the first pinch rollers 111B, 112B and the second pinch roller 421B are biased towards the first driving rollers 111A, 112A and the second driving roller 121A.

Also in the image reading apparatus having the above configuration of the fourth illustrative embodiment, a situation in that the conveyance resistances acting on the card CA are unbalanced is unlikely to occur. Hence, according to the image reading apparatus of the fourth illustrative embodiment, it is possible to convey the sheet SH and the card CA having the different widths and to suppress the skew of the card CA in the card conveyance area 20 of the conveyance path 10.

Fifth Illustrative Embodiment

Figure 14:
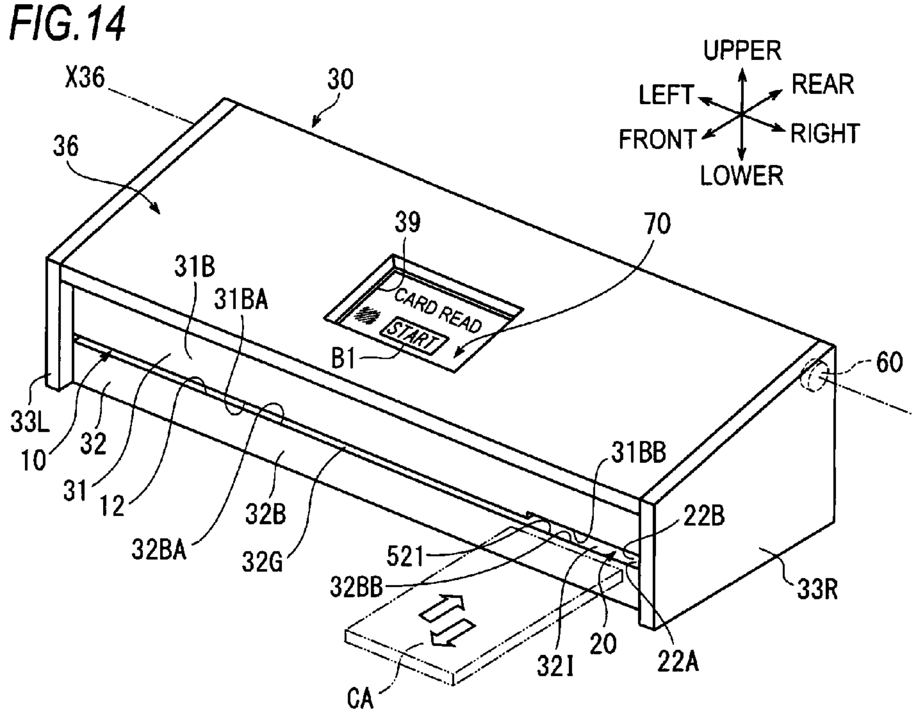
FIG. 14 is a front perspective view illustrating an image reading apparatus according to a fifth illustrative embodiment.
Figure 15:
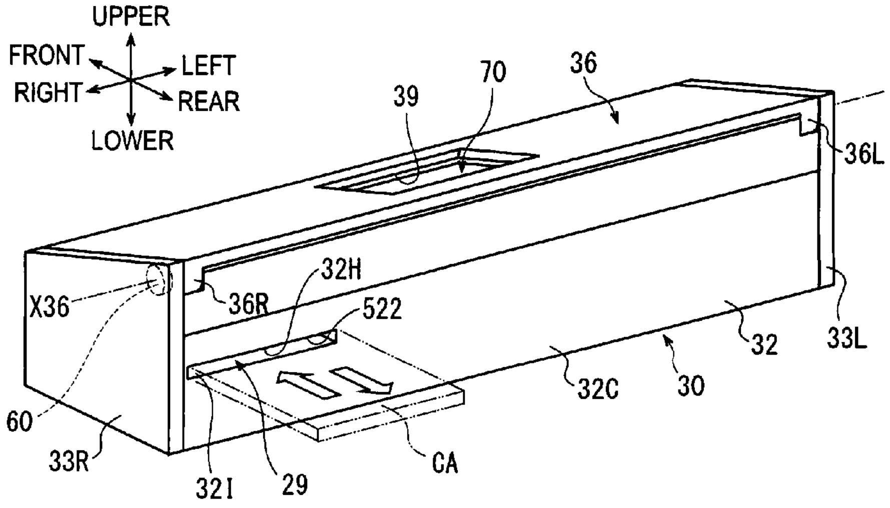
FIG. 15 is a rear perspective view illustrating the image reading apparatus according to the fifth illustrative embodiment.

As shown in FIGS. 14 and 15, according to an image reading apparatus of a fifth illustrative embodiment, the second discharge opening 22 of the image reading apparatus 1 of the first illustrative embodiment is changed into a second introduction/discharge opening 521, and also the second introduction opening 21 of the image reading apparatus 1 of the first illustrative embodiment is changed into an intermediate discharge opening 522. The other configurations of the fifth illustrative embodiment are the same as those of the first illustrative embodiment. Therefore, the same configurations as those of the first illustrative embodiment are denoted with the same reference numerals, and the descriptions thereof will be omitted or simplified.

The second introduction/discharge opening 521 has the same shape as the second discharge opening 22 of the first illustrative embodiment. The second introduction/discharge opening 521 is used in common with a part of the right end-side of the first discharge opening 12. The intermediate discharge opening 522 has the same shape as the second introduction opening 21 of the first illustrative embodiment.

The card CA is introduced into the second introduction/discharge opening 521. The pair of second conveyance rollers 120 of the upstream-side conveyance unit 41 and the pair of second conveyance rollers of the downstream-side conveyance unit 42 convey the card CA in the card conveyance area

20 to the rear direction. The rearward conveyance of the card CA is executed as the CPU of the control substrate 54 controls the conveyance unit 40 to perform a counter conveyance in an opposite direction to the rotating direction of the conveyance unit 40 of the first illustrative embodiment. Then, the card CA passes through the card passing path 29 and is partially discharged to the outside of the housing 30 through the intermediate discharge opening 522. That is, the card CA is conveyed to the rear direction until it reaches the start position. Then, the pair of second conveyance rollers 120 of the upstream-side conveyance unit 41 and the pair of second conveyance rollers of the downstream-side conveyance unit 42 convey the card CA in the card conveyance area 20 to the front direction. At this time, the images of the card CA are read by the image reading sensors 55A, 55B, and then the card CA is discharged to the outside of the housing 30 through the second introduction/discharge opening 521.

The image reading apparatus of the fifth illustrative embodiment can also realize the same operational effects as those of the image reading apparatus 1 of the first illustrative embodiment.

Sixth Illustrative Embodiment

Figure 16:
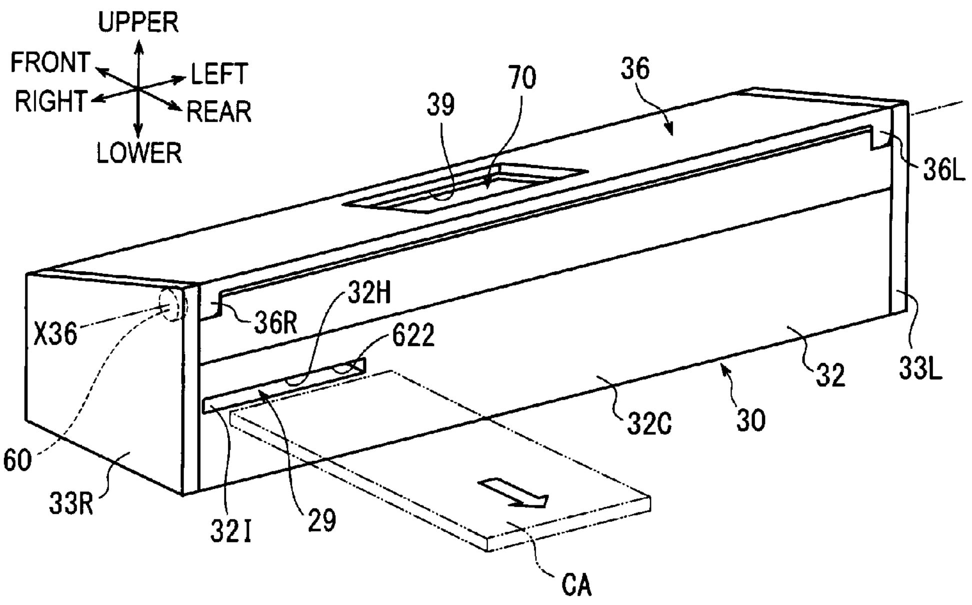
FIG. 16 is a rear perspective view illustrating an image reading apparatus according to a sixth illustrative embodiment.

As shown in FIG. 16, according to an image reading apparatus of a sixth illustrative embodiment, the second discharge opening 22 of the image reading apparatus 1 of the first illustrative embodiment is changed into a second introduction opening into which the card CA is introduced, and also the second introduction opening 21 of the image reading apparatus 1 of the first illustrative embodiment is changed into a second discharge opening 622 through which the card CA is discharged. The other configurations of the sixth illustrative embodiment are the same as those of the first illustrative embodiment. Thus, the same configurations as those of the first illustrative embodiment are denoted with the same reference numerals, and the descriptions thereof will be omitted or simplified.

Like the second introduction/discharge opening 521 of the fifth illustrative embodiment, the second introduction opening of the sixth illustrative embodiment has the same shape as the second discharge opening 22 of the first illustrative embodiment. Thus, the second introduction opening is not shown. The second discharge opening 622 has the same shape as the second introduction opening 21 of the first illustrative embodiment.

The card CA is introduced into the second introduction opening. The pair of second conveyance rollers 120 of the upstream-side conveyance unit 41 and the pair of second conveyance rollers of the downstream-side conveyance unit 42 convey the card CA in the card conveyance area 20 to the rear direction. After the images of the card CA are read by the image reading sensors 55A, 55B, the card CA passes through the card passing path 29 and is discharged to the outside of the housing 30 through the second discharge opening 622.

The image reading apparatus of the sixth illustrative embodiment can also realize the same operational effects as those of the image reading apparatus 1 of the first illustrative embodiment.

Although this disclosure has been described on the basis of the first to sixth illustrative embodiments, this disclosure is not limited to the first to sixth illustrative embodiments and can be appropriately changed and applied without departing from the gist thereof.

In the first illustrative embodiment, the upstream-side conveyance unit 41 and the downstream-side conveyance unit 42 have the same configuration. However, this disclosure is not limited thereto. For example, the downstream-side conveyance unit 42 may have a configuration different from that of the upstream-side conveyance unit 41. Specifically, while the pair of first conveyance rollers 110 of the upstream-side conveyance unit 41 may convey the sheet SH and the pair of second conveyance rollers 120 may convey the card CA, all the pairs of conveyance rollers of the downstream-side conveyance unit 42 may convey the sheet SH and the card CA.

In the first illustrative embodiment, the card CA is discharged to the outside of the housing 30 through the second discharge opening 22. However, the card CA may be temporarily exposed to the outside through the second discharge opening 22, reversely conveyed towards the second introduction opening 21 and then discharged to the outside of the housing 30 through the second introduction opening 21.

In the first illustrative embodiment, the image reading sensors 55A, 55B have the CIS. However, this disclosure is not limited thereto. For example, a charge coupled device (CCD) and the like may be adopted, instead of the CIS.

This disclosure can be applied to an image reading apparatus, an image forming apparatus, a complex machine and the like.

What is claimed is:

1. An image reading apparatus comprising:

a housing having a conveyance path where a first medium and a second medium that is narrower and thicker than the first medium are conveyed;

a pair of first conveyance rollers that has a first driving roller and a first pinch roller, which is biased towards the first driving roller and is rotated by the first driving roller, and is configured to convey the first medium on the conveyance path;

a pair of second conveyance rollers that has a second driving roller and a second pinch roller, which is rotated by the second driving roller, and is configured to convey the second medium on a conveyance area that is positioned at one end-side of the conveyance path in an axis direction of the second driving roller, an outer diameter of the second pinch roller is smaller than an outer diameter of the first pinch roller; and a reading unit configured to read images of the first and second media, wherein the first driving roller and the first pinch roller are positioned at an outside of the conveyance area in the axis direction, wherein the second driving roller and the second pinch roller are positioned at an inside of the conveyance area in the axis direction, wherein the first driving roller and the second driving roller are rotatably supported about a driving shaft center parallel with the axis direction, and wherein the first pinch roller and the second pinch roller are rotatably supported about a driven shaft center parallel with the driving shaft center.

2. The image reading apparatus according to claim 1, wherein the second pinch roller is positioned with a gap between surface of the second driving roller and surface of the second pinch roller when the second driving roller and the second pinch roller do not hold the second medium, and the gap is smaller than a thickness of the second medium and larger than a thickness of the first medium.

3. The image reading apparatus according to claim 1, wherein the second pinch roller has a friction coefficient which is smaller than a friction coefficient of the first pinch roller.

4. The image reading apparatus according to claim 1, wherein the first pinch roller has a first driven shaft that defines the driven shaft center, wherein the second pinch roller has a second driven shaft that is a separate member from the first driven shaft, centered on the driven shaft center, wherein the first driven shaft and the second driven shaft are respectively biased towards the driving shaft center.

5. The image reading apparatus according to claim 4, further comprising:

a first bearing provided to rotatably support the first driven shaft; and a second bearing provided to rotatably support the second driven shaft wherein an outer diameter of the first driven shaft is equal to an outer diameters of the second driven shaft, and wherein a position at which the first bearing contacts the first driven shaft and a position at which the second bearing contacts the second driven shaft are corresponding to each other in the axis direction.

6. The image reading apparatus according to claim 1, wherein the first pinch roller and the second pinch roller share one common driven shaft defining the driven shaft center, and wherein the common driven shaft is biased towards the driving shaft center.

7. The image reading apparatus according to claim 1, wherein the first pinch roller has a first driven shaft that defines the driven shaft center, wherein the second pinch roller has a second driven shaft that is a separate member from the first driven shaft and defines the driven shaft center, and wherein the image reading apparatus comprises a holder that holds the first driven shaft and the second driven shaft and a biasing part that biases the holder towards the driving shaft center.

8. An image reading apparatus comprising:

a housing having a conveyance path where a first medium and to guide a second medium that is narrower and thicker than the first medium are conveyed;

a pair of first conveyance rollers that has a first driving roller and a first pinch roller, which is biased towards the first driving roller and is rotated by the first driving roller, and is configured to convey the first medium on the conveyance path;

a pair of second conveyance rollers that has a second driving roller and a second pinch roller, which is rotated by the second driving roller, and is configured to convey the second medium on a conveyance area that is positioned at one end-side of the conveyance path in an axis direction of the second driving roller an outer diameter of the second pinch roller being the same as an outer diameter of the first pinch roller; and a reading unit configured to read images of the first and second media, wherein the first driving roller and the first pinch roller are positioned at an outside of the conveyance area in the axis direction, wherein the second driving roller and the second pinch roller are positioned at an inside of the conveyance area in the axis direction, wherein the first driving roller and the second driving roller are rotatably supported about a driving shaft center parallel with the axis direction, and wherein the first pinch roller is rotatably supported about a first driven shaft center parallel with the driving shaft center, wherein the second pinch roller is rotatably supported about a second driven shaft center that is parallel with the driving shaft center and is more spaced from the driving shaft center than the first driven shaft center, wherein the first pinch roller has a first driven shaft that defines the first driven shaft center, wherein the second pinch roller has a second driven shaft that is a separate member from the first driven shaft and defines the second driven shaft center, and wherein the image reading apparatus comprises a holder that holds the first driven shaft and the second driven shaft and a biasing part that urges the holder towards the driving shaft center.

9. An image reading apparatus comprising:

a housing having a conveyance path;

a pair of first conveyance rollers comprising:

a first driving roller rotatably supported about a first driving shaft center parallel with an axis direction; and a first pinch roller towards the first driving roller and rotatably supported about a driven shaft center parallel with the driving shaft center, a pair of second conveyance rollers comprising:

a second driving roller supported about the first driving shaft center; and a second pinch roller rotatably supported about the driven shaft center and having an outer diameter smaller than an outer diameter of the first pinch roller, and an image reader extending along the axis direction, wherein the pair of the first conveyance rollers is positioned outside of a conveyance area in the axis direction, the conveyance area is positioned at one end-side of the conveyance path in the axis direction, wherein the pair of the second conveyance rollers is positioned inside the conveyance area in the axis direction.

10. An image reading apparatus according to claim 9, wherein the housing comprising an introduction opening, of which a length in the axis direction shorter than a length of the image reader in the axis direction, and wherein the introduction opening is provided at an end of the conveyance area.

* * * * *